United States Patent [19]
Messick

[11] 3,768,527
[45] Oct. 30, 1973

[54] LATHE IMPROVEMENTS

[76] Inventor: Richard A. Messick, 2661 Andover Ave., Fullerton, Calif. 92631

[22] Filed: Feb. 7, 1972

[21] Appl. No.: 223,915

[52] U.S. Cl............................ 142/38, 142/7, 82/14
[51] Int. Cl............................................... B23b 3/28
[58] Field of Search ..................... 142/7, 1, 13, 15, 142/36, 40, 38, 47, 49, 37, 41, 42, 39, 43, 44, 48, 55; 82/14

[56] References Cited
UNITED STATES PATENTS

| | | | |
|---|---|---|---|
| 1,991,051 | 2/1935 | Cook................................ | 142/38 R |
| 2,745,445 | 5/1956 | Klawitter....................... | 142/49 R X |
| 3,204,671 | 9/1965 | Schoenrock ....................... | 142/7 R |
| 2,068,625 | 1/1937 | Burton .............................. | 142/38 R |
| 2,880,767 | 4/1959 | Rodgers............................ | 142/55 R |
| 839,752 | 12/1906 | Guenzler........................... | 142/49 R |
| 2,769,466 | 11/1956 | Brauheis ............................ | 142/7 R |
| 3,332,458 | 7/1967 | Baldwin ............................ | 142/7 R |
| 3,277,933 | 10/1966 | Lalli................................ | 142/47 R |

Primary Examiner—Harrison L. Hinson
Attorney—Robert E. Strauss

[57] ABSTRACT

A tool and cooperative work table and pattern support means are described which can be used with a lathe to permit accurate duplication of turnings or of two dimensional patterns. The pattern support means are operative to secure a pattern beneath and in vertical alignment with the work center of the lathe; the table provides an offset surface for support of the tool; and the tool has a base plate with a first arm that supports a pattern follower and a second arm which supports the cutting tool above and in vertical alignment therewith. The height of the second arm is preferably adjustable to permit its adjustment to the work center of different lathes. The tool rests on the table and is freely movable thereon to permit its use at angles such as 45, 60 or 90 degrees to the work, as desired.

12 Claims, 4 Drawing Figures

PATENTED OCT 30 1973 3,768,527

LATHE IMPROVEMENTS

DESCRIPTION OF THE INVENTION

This invention relates to small, hobby-type lathes and in particular relates to a tool and cooperative attachments therefor to permit faithful copying of turnings or two dimension patterns.

Small lathes are a very popular and versatile tool for the hobbyist and craftsman. The versatility of this tool is limited by its incapability to permit the exact or faithful duplication of patterns. Mechanisms for accurate control of the direct and cross feeds on a lathe to permit duplication of patterns are prohibitively complicated and expansive for a hobbyist. Accordingly, duplication of patterns or turnings can be accomplished only by tedious checking and rechecking of the work with micrometers or templates or calipers.

A few tools or attachments have been proposed for use with lathes to permit duplication of patterns. These tools have failed to provide maximum usefulness and a common failing has been their inability to permit undercutting of the work piece. Other failings have been their inability for use on faceplate or screw center turning and a cumbersome, unwieldly structure.

It is, therefore, an object to provide means useful in combination with a lathe to provide accurate and simple duplication of patterns or turnings.

It is also an object of the invention to provide such means as a combination of attachment means for a lathe and a tool useful therewith.

It is an additional object of the invention to provide such means which possesses the capability to make undercuts in lathe turnings or even to turn free rings on spindle turnings.

It is a further object of the invention to provide such means with the capability to duplicate faceplate, screw center and spindle turnings.

Other and related objects will be apparent from the following description of the invention.

The preceding objects are achieved by the invention that includes a tool having a base plate, a pattern follower carried thereon at the leading edge of the plate, a bracket member substantially at right angle to the plate and carried at the rear thereof, a second arm attached to said bracket member and supporting at its free end a cutting member in a position directly above and in vertical alignment with the pattern follower and, preferably, attachment means between the second arm and the bracket member to permit adjustment of the height of the arm above the base plate to accomodate to lathes having varied swings over the bed.

The table used with the aforedescribed tool comprises a flat plate having attachment means permitting its removable attachment to the bed or ways of the lathe, extending from beneath the work center of the lathe to one side thereof. The pattern support means comprises means for securing the pattern or a turning adjacent the surface of the table and directly beneath the work center of the lathe.

The invention will now be described with reference to the FIGS., of which:

Figures 1, 2, 3, 4:
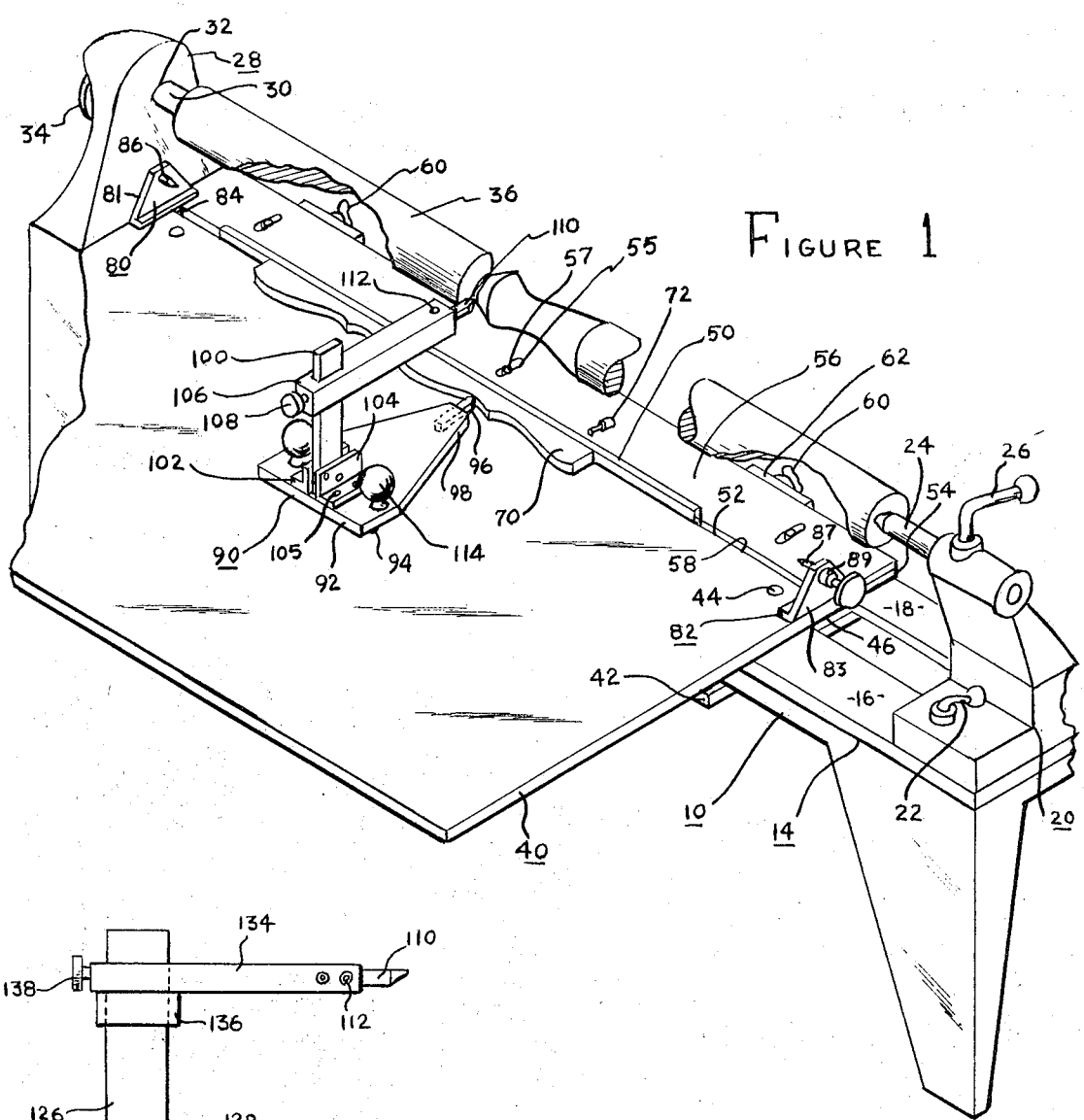
FIG. 1 illustrates a lathe, the table, pattern support means and tool of the invention.
FIG. 2 is a side view of an alternative tool.
FIG. 3 illustrates the manner in which the tool accomplishes undercutting.
FIG. 4 shows an alternative pattern support means.

Referring now to FIG. 1, the lathe is shown on a bench 10 having support legs 12. The bed of the lathe 14 is shown with two parallel ways 16 and 18. These are shown as essentially flat rails, however, other construction can be used, e.g., tubular ways are used in many hobbyist or craftsman type lathes. The lathe has a conventional tailstock or headstock 20 which is slidably mounted on the lathe and is locked in a position along the length of the lathe by suitable means, e.g., hand lever 22. The tailstock supports a spindle taper 24 which can be advanced or withdrawn in the tailstock and which has its position in thetailstock locked by handcrank 26.

The lathe has a conventional headstock 28 with a headstock taper 30 that fits into a shaft 32 that is supported by suitable bearing means in the headstock and that has, on its opposite end, pulley 34. Any suitable means for driving pulley 34 can be used and is not illustrated in the drawings. The lathe illustrated is conventional in construction and is shown with a wooden spindle 36 extending between the headstock and the tailstock tapers.

The table employed in the invention is illustrated at 40 and comprises a generally flat, rectangularly shaped surface. This table can be formed of any suitable material, e.g., plywood, chipboard, rigid plastic, sheet metal, etc., any of which can bear reinforcing members on its undersurface such as steel channels or angles, etc. As illustrated, the table comprises a flat sheet of plywood. The table bears attachment means on its underside to enable it to be secured to the ways of the lathe. While various clamping means can be used, it is preferred to use a relatively simple clamping means which comprises an elongated member 42 which is attached to the table 40 by bolt 44. For additional stability, block means such as 46 can also be used which is approximately equal in width to the distance between the ways of the lathe. The table is mounted on the lathe by turning member 32 parallel to the ways of the lathe and setting the table on the lathe with member 42 passing between the ways of the lathe. Member 42 is then rotated about bolt 44 and the nut on bolt 44 is tightened to bind the ends of member 42 against the undersurfaces of the ways. A similar attachment means can be used at the opposite end of table 40 to insure that the table will be securely locked to the lathe during use of the tool.

As shown the attachment means is adjacent the edge of table 40 which is beneath the work center of the lathe so that the majority of table 40 projects to one side of the lathe.

Various pattern support means can be used with the invention. The pattern support means can be carried on the lathe independently of the table 40. It is preferable, however, to mount the pattern support means on the table 40. Various pattern support means can be used. A convenient support means comprises rail 50 which is shown extending across the central portion of table 40. This rail can be permanently secured to the board, if desired, or can be clamped thereto. A suitable clamping means comprises groove 52 in the table 40. This groove is formed at the centerline of the lathe by providing a reduced thickness of the table 40 at 54. A thin flat plate 56 is overlaid on the portion 54 of reduced thickness. Plate 56 can be provided with a plurality of transverse slots 55 and pins 57 can be inserted into table 40 to permit a slidable adjustability of plate 56 so that the inboard edge of plate 56 together with shoulder 58 of table 40 form groove 52. If desired, the table can be provided with suitable clamping means to compress the edge of plate 56 towards shoulder 58 and thereby bind any material in groove 52. This is illustrated in the drawing and the work piece 36 has been partially sectioned to reveal the clamp means. The clamping means simply comprises the wing nut such as 60 which is threaded on a shaft that is secured to the far edge of table 40. This shaft can be embedded or threaded into the edge of the portion 54 of the board or can be secured thereto by suitable bracket means, not shown. A clamping bracket 62 is also mounted on the shaft so that the advance of wing nut 60 on its shaft urges bracket 62 towards table 40 and forces the edge of plate 56 towards shoulder 58. One or a plurality of such clamping means can be provided as shown.

Rail 50 serves admirably for support of patterns of the desired turning. Such a pattern is shown at 70. The pattern 70 can be secured against longitudinal displacement along rail 50 by various clamping means. Pin means 72 which extends through one of a plurality of bores in rail 50 and into a bore in pattern 70 can be used. Spring biased or C-clamps can also be used to lock the pattern to the rail 50.

Frequently, however, the pattern of the desired turning will not be available. Instead, it will be desired to duplicate a previous truning of which no pattern is available. Accordingly, the invention has means permitting the direct duplicating of a turning without the necessity to prepare a pattern therefrom. This means is the alternative support means that comprises an auxilary pattern headstock 80 and tailstock 82 which are shown at each end of table 40. These comprise a generally upright bracket 81 and 83 which have means for the removable attachment of a turning to table 40 at any point below the work center of the lathe. In the embodiment illustrated, which has groove 52, the brackets 81 and 83 can simply have a lip 84 which is shown as projecting beneath the undersurface of bracket 81 to engage groove 50. The upper portion of bracket 81 shows pin means 86 which can be used to support one end of a turning that is to be duplicated. A similar pin 87 is carried by the pattern tailstock bracket 83. To permit the engagement and disengagement of the turning without loosening nuts 60 and moving the pattern mounting brackets 81 and 83, pin 87 can have a threaded shank and be turned into a threaded boss 89 of bracket 83 to permit its advance or retraction.

The tool for duplicating turnings or patterns is shown at 90. This tool comprises a base, which can be a plate such as 92 that can be moved freely on table 40. The base carries glide means such as 94 that can be formed of metal, plastic or a hard rubber. Three such glides are employed for a tripod support of the plate; two of the glides are placed at outboard positions at the trailing end of the tool and the remaining glide is placed at the leading edge. The base plate is in the form of a triangle or a T to support the three glides and to avoid any protruding leading corners that would otherwise interfere with its free movement on table 40. At its leading edge, base 92 supports pattern follower 96 which is removably attached thereto, preferably by setting the follower 96 in a slot or mortise in the leading edge of the plate that is along the longitudinal axis of the base 92. The pattern follower 96 can be locked to base 92 by suitable means such as one or a plurality of set screws 98. These set screws can extend from the upper surface or from opposite edges of plate 92 and into contact with the inboard end of follower 96. Adjacent its trailing end, base 92 supports an upright column or post member 100. This member is supported at substantially right angles to the base 92 and can be secured thereto by any suitable means such as the angle brackets 102 and 104 that are attached to plate 92 by welding or by means such as machine screws 105.

A tool support arm 106 is slidably mounted on post 100. If the tool is designed for use with only one size lathe, i.e., lathes of one swing distance, arm 106 can be rigidly secured to post 100. Preferably, however, the arm 106 is slidably mounted on post 100 using the mortise and tenon type connection shown. Arm 106 is mortised to securely fit about post 100 and can be locked thereto by various means such as set screws or thumb screws 108 which extends from the rear face of arm 106 inwardly to intersect with the rear face of post 100.

The length of arm 106 is sufficient to permit it to support cutting tool or chisel 110 directly over and in precise vertical alignment with pattern follower 96. As with the support for the pattern follower, chisel 110 is also fitted into a bore or mortised cavity that extends along the longitudinal axis of the arm 106 from its leading edge. The chisel is locked to arm 106 by one or more set screws 112.

As previously mentioned, the tool is freely movable about the entire surface of table 40. To facilitate movement, tool 90 is provided with one or more hand grips 114 which are placed at outboard positions at the rear of plate 92. A forward and downward pressure on these grips, which is the natural force applied by an operator, will urge the tool 90 securely against the table 40 and pattern follower 96 firmly against the pattern 70.

FIG. 2 illustrates another embodiment of the tool. In this embodiment, plate 120 has glides such as 94 previously described on its under surface. At its leading edge, plate 120 supports follower 96 by means such as clamping bracket member 122 which is secured on the longitudinal axis of plate 120 by welding or other suitable means. The bracket has a longitudinal mortise or bore which accommodates the shank of the pattern follower 96 in a sliding fit. A locking thumb screw 124 is provided to secure follower 96 in place, by projecting through a threaded bore in bracket 122 and into a binding engagement with the shank of follower 96.

The read surface of plate 120 bears upright post 126 which can be secured at substantially right angles to plate 120 by welding, means such as brackets 102 and 104, etc. Post 126 can be tubular if desired, or can be rectangular in cross section similarly to post 100 previously described. An additional pattern follower is shown on this post. This comprises follower support arm 128 which has an aperture at its rear end that fits the cross section of post 126 and provide a sliding fit thereto. Again, this arm be set at any vertical position on post 126 and locked thereto by set screws or any other suitable means, e.g., thumb screw 130 which projects through a threaded bore in the rear face of arm 128 and into binding engagement with the rear face of post 126.

The forward end of arm 128 carries a pattern follower 96 which is mounted in a bore or mortise that extends from the leading edge of the arm rearwardly along its longitudinal axis. The position of the follower can be locked by thumb screw 132 which projects through a threaded bore and into engagement with the top edge of the shank of follower 96.

The tool also carries chisel support arm 34. This arm, as arm 128, has an opening or aperture at its rear end to fit about post 126 and provide a sliding engagement therewith. The rigidity of the arm can be increased by sleeve or auxiliary bracket 136 that fits about post 126 and that is rigidly secured to the under surface of arm 134, as shown. One or more lock screws 138 can be provided to project into a threaded tap in arm 134 or bracket 136 and bind against post 126 to lock the vertical position of arm 134.

The opposite end of arm 134 bears the chisel 110. A bore or mortise can be provided in the free end of this arm to extend along its longitudinal axis and the chisel is placed in this cavity. One or more set screws 112 can be used to lock the position of the chisel in arm 134. The chisel is thereby adjustably positioned directly above and in precise vertical alignment with followers 96.

The tool shown in FIG. 2 also has hand grips 114 which can be of any suitable shape; the spherical grips as shown have proven to be very satisfactory.

FIG. 3 illustrates the position of the tool when a pattern is used that requires undercutting. The pattern is shown as 140 and is positioned on the centerline of the lathe 141. The tool is shown in a sectional view taken through its upright post 100 to remove structure that would interfere with the view of the pattern and pattern follower. The follower is shown projecting into recess 144 of the pattern which is at an acute angle with the centerline of the lathe, requiring an undercutting of the work. As apparent from FIG. 1, plate 92 of the tool is beneath the work and there are no obstructions preventing the movement of the plate into the position shown.

The tool of the invention can be freely moved about on the surface of table 40 and can be used for spindle turning as shown, or can be used for face plate turning or screw center turning.

The table 40 shown in FIG. 1 extends substantially the entire distance between the headstock and tailstock of the lathe. Frequently, however, it will be desired to turn a spindle of shorter length. It is, therefore, desirable to provide a narrower table than shown, e.g., a table which extends from one-third to one-half the length of the ways of the lathe. With the narrower table, the patern support means are preferably carried on the lathe, e.g., on the headstock and tailstock. FIG. 4 shown such pattern support means as bracket means 150 which bears spindel support pin 152 at a central position. The bracket can be a metal plate and the pin 152 can be welded thereto or can have a threaded shank which is turned into a tapped bore in the plate. The plate also has mounting apertures 154 which are shown as slots extending inwardly from its lower edge. The headstock 28 is shown with two mounting screws 156 which are turned into tapped bores in the headstock. The bores are placed at the same center to center distance as slots 154 and centered on the headstock so that pin 152 will be directly beneath the work centerline of the lathe when the bracket is placed on the shanks of the screws 156. The heads of these screws can be knurled to provide a grippingsurface to lock the bracket securely to the headstoke. A similar bracket and mounting means can be provided for the tailstock so that the pattern support means is independent of the table means. This will permit the use of a narrower table than illustrated. When the desired work is longer than the width of the table, the latter can be readily moved along the ways of the lathe as the work progresses.

While the invention has been described with reference to a presently preferred embodiment, it is not intended that the invention be unduly limited by this illustration. Instead, it is intended that the invention be or the scope set forth by the means and their obvious equivalents of the following claims.

I claim:

1. A tool having the capability for duplicating curvatures on lathe turnings which comprises:
    a base having a leading end and a trailing end;
    a pattern follower with means to support said follower on said base with said follower projecting forward of the leading end thereof;
    an upright columnar member mounted at substantially at a right angle to said base and carried adjacent the trailing end thereon;
    an arm attached to said columnar member and projecting above the longitudinal axis of said base;
    attachment means securing said arm to said columnar member;
    a cutting means carried by said arm and positioned thereby directly above and in vertical alignment with said pattern follower; and
    attachment means removable securing said cutting means to said arm.

2. The tool of claim 1 wherein said pattern follower is mounted in a slot in said base and extending along the longitudinal axis of said base from the leading edge thereof.

3. The tool of claim 1 wherein said attachment means comprises bracket means adjustably slidable on said upright columnar member with means to lock said bracket means fixedly to said member.

4. The tool of claim 3 wherein said pattern follower is mounted in a bracket carried on the top surface of said plate.

5. The tool of claim 3 wherein said pattern follower is carried on the end of a second arm that is slidably attached to said columnar member with attachment means permitting locking of said second arm at any vertical position thereon.

6. The tool of claim 3 wherein said base plate carries hand grip means at outboard positions on its rear surface.

7. The combination of the tool of claim 3 with table means comprising a generally flat working surface with means along the undersurface of one edge thereof to permit its removable attachment to the ways of a lathe.

8. The combination of claim 7 wherein said attachment means comprises at least one elongated member pivotally mounted on the undersurface of said table and operative to rotate into a position with its end biased against the undersurface of the ways of the lathe.

9. The combination of claim 7 wherein said table carries pattern supporting means for the removable supporting of a pattern of the desired curvature directly beneath the centerline of the lathe.

10. The combination of claim 9 wherein said pattern supporting means comprises rail means secured along a line directly beneath the centerline of the lathe.

11. The combination of claim 9 wherein said pattern supporting means comprises means for supporting a turning directly beneath the centerline of the lathe with bracket means carried by the table bearing opposed pin means for securing said turning therebetween.

12. The tool of claim 1 wherein said base supports, on its undersurface, a glide means at its leading edge and a pair of glide means on its trailing edge.

* * * * *